United States Patent
Cermak

(10) Patent No.: US 8,235,395 B2
(45) Date of Patent: Aug. 7, 2012

(54) JOINT SEAL

(75) Inventor: Herbert Cermak, Bessenbach (DE)

(73) Assignee: GKN Driveline Deutschland GmbH, Offenbach (DE)

( * ) Notice: Subject to any disclaimer, the term of this patent is extended or adjusted under 35 U.S.C. 154(b) by 734 days.

(21) Appl. No.: 11/666,571

(22) PCT Filed: Jul. 28, 2005

(86) PCT No.: PCT/EP2005/008166
§ 371 (c)(1),
(2), (4) Date: Mar. 12, 2009

(87) PCT Pub. No.: WO2006/045362
PCT Pub. Date: May 4, 2006

(65) Prior Publication Data
US 2009/0230634 A1    Sep. 17, 2009

(30) Foreign Application Priority Data
Oct. 28, 2004    (DE) .......................... 10 2004 052 313

(51) Int. Cl.
*F16J 15/32* (2006.01)
*F16J 3/00* (2006.01)
*F16C 3/03* (2006.01)
*F16D 3/84* (2006.01)
(52) U.S. Cl. .................... 277/552; 277/635; 464/175
(58) Field of Classification Search .................. 277/551, 277/572, 576, 577, 634–636; 464/133, 173, 464/175
See application file for complete search history.

(56) References Cited

U.S. PATENT DOCUMENTS

| 4,224,808 | A | * | 9/1980 | Gehrke | 464/175 |
|---|---|---|---|---|---|
| 4,392,838 | A | * | 7/1983 | Welschof et al. | 464/175 |
| 4,403,781 | A | * | 9/1983 | Riemscheid | 464/175 |
| 4,556,400 | A | * | 12/1985 | Krude et al. | 464/181 |
| 5,297,996 | A | * | 3/1994 | Draga | 464/175 |
| 6,244,967 | B1 | | 6/2001 | Takabe et al. | |
| 6,264,568 | B1 | * | 7/2001 | Frazer et al. | 464/173 |
| 6,820,876 | B2 | * | 11/2004 | Iwano | 277/635 |
| 7,063,331 | B2 | * | 6/2006 | Iwano | 277/634 |
| 7,229,356 | B2 | * | 6/2007 | Iwano | 464/17 |
| 2004/0232630 | A1 | * | 11/2004 | Gasper | 277/635 |
| 2005/0192106 | A1 | | 9/2005 | Cermak | |

FOREIGN PATENT DOCUMENTS

| DE | 2 362 764 | 7/1974 |
|---|---|---|
| DE | 100 20 975 A1 | 11/2001 |
| GB | 2 134 994 A | 8/1984 |
| GB | 2 206 949 A | 1/1989 |

* cited by examiner

*Primary Examiner* — Thomas Beach
*Assistant Examiner* — Nicholas L Foster
(74) *Attorney, Agent, or Firm* — Rader, Fishman & Grauer, PLLC

(57) ABSTRACT

A joint seal of a constant velocity universal joint which has a sealing effect relative to a shaft journal includes an axial securing sleeve which is connected to the inner joint part and which ends in individual axial fingers which radially elastically engage an annular groove in the shaft journal, wherein the ventilation channels for the joint interior of the constant velocity universal joint are formed by axial slots between the individual axial fingers which freely end in the interior of the rolling boot and can be closed towards the outside of the rolling boot by a sealing lip which is formed on to the rolling boot, which, in the position of rest, annularly sealingly contacts the shaft journal and which, at an increased speed, lifts off the shaft journal to expose the ventilation channels.

19 Claims, 4 Drawing Sheets

JOINT SEAL

TECHNICAL FIELD

The invention relates to a joint seal of a constant velocity universal join which has a sealing effect relative to a shaft journal and which is firmly connected to the inner joint part of the constant velocity universal joint by means of a rolling boot which is at least indirectly firmly connected to the outer joint part of the constant velocity universal joint, wherein axial fixing of the constant velocity universal joint relative to the shaft journal is effected by an axial securing sleeve which is connected to the inner joint part and which ends in individual axial fingers which radially elastically engage an annular groove in the shaft journal and are secured by a collar associated with and positioned on the rolling boot and having a slipped-on tensioning strip.

BACKGROUND

Constant velocity universal joints, more particularly VL plunging joints which, in the way as defined above, are axially secured relative to the shaft journal inserted into the inner joint part, were described for the first time in the earlier application U.S. Publication No. 2005/0192106 wherein the rolling boot or the convoluted boot used, in the form of an integral part of the axial securing means, is welded to the inner joint part by means of a new type of axial securing sleeve which preferably consists of plate metal, which is welded to the inner joint part and which is secured with radially elastic fingers with the help of a rolling boot or a tensioning strip in an annular groove of the shaft journal.

It is generally known that sealing assemblies of constant velocity universal joints should comprise a ventilation system which, with an increasing operating temperature, permits a decrease in the excess pressure in the joint interior to prevent the convoluted boot or rolling boot from distending and suffering damage in operation as a result of an unspecified shape. On the other hand, the ventilation system has to be designed in such a way that water and dirt are prevented from entering the joint interior, more particularly when the vehicle in which the constant velocity universal joint is used drives in a wading style. As the percentage of off-highway vehicles increases in all markets all over the world, this has become an increasingly important factor. Ventilation systems which include the deformation of the rolling boot or convoluted boot under the influence of centrifugal forces for controlled releasing or closing purposes are already known.

SUMMARY OF THE INVENTION

The present invention provides a cost-effective and operationally safe ventilation system for joint sealing purposes which can be used in connection with the initially described axial securing system.

A first solution consists in providing a joint seal of a constant velocity universal joint which has a sealing effect relative to a shaft journal and which is firmly connected to the inner joint part of the constant velocity universal joint by means of a rolling boot which is at least indirectly firmly connected to the outer joint part of the constant velocity universal joint, wherein axial fixing of the constant velocity universal joint relative to the shaft journal is effected by an axial securing sleeve which is connected to the inner joint part and which ends in individual axial fingers which radially elastically engage an annular groove in the shaft journal and are secured by a collar associated with and positioned on the rolling boot and having a slipped-on tensioning strip. The ventilation channels for the joint interior of the constant velocity universal joint are formed by axial slots between the individual axial fingers which freely end in the interior of the rolling boot and can be closed towards the outside of the rolling boot by a sealing lip which is formed on to the rolling boot, which, in the position of rest, annularly sealingly contacts the shaft journal or a component connected thereto and which, at an increased speed, with the ventilation channels being released, lifts off the shaft journal or the component connected thereto.

In this way, slots existing between the axial fingers are incorporated into the ventilation system, which is advantageous in that there is no need to provide longitudinal grooves or the like in the shaft journal nor is it necessary for any longitudinal channels to be formed into the collar of the convoluted boot. The shaft journal thus comprises an unweakened carrying cross-section, whereas the convoluted boot can be produced and removed from its mould in an advantageous easy way. In the condition of rest, the sealing lip sealingly rests on the shaft journal or a component connected thereto. More particularly, it is advantageous to provide the contact face in the form of a radial contact face, in which case the sealing lip can comprise a slightly conical shape. The axial position of the collar of the convoluted boot and thus also of the sealing lip after assembly is accurately specified. This results in an easily reproducible pretension of the sealing lip at the respective contact face. At an increased speed, the sealing lip, under the influence of the centrifugal force, can deform itself from the conical shape to a more pronounced radial planar shape, so that there is freed an annular gap from where the free ends of the slots can be connected to the environment. In an advantageous way, the ventilation system can be closed at its free ends, so that if the vehicle drives slowly or wades, no water or dirt can penetrate into the interior of the convoluted boot.

A second solution consists in providing a joint seal of a constant velocity universal joint which has a sealing effect relative to a shaft journal and which is firmly connected to the inner joint part of the constant velocity universal joint by means of a rolling boot which is at least indirectly firmly connected to the outer joint part of the constant velocity universal joint. Axial fixing of the constant velocity universal joint relative to the shaft journal is effected by an axial securing sleeve which is connected to the inner joint part and which ends in individual axial fingers which radially elastically engage an annular groove in the shaft journal and are secured by a collar of the rolling boot with a slipped-on tensioning strip. The ventilation channels for the joint interior are formed by axial slots between the individual axial fingers which end freely towards the outside of the rolling boot, which, inside the rolling boot, can be closed by a wall of the rolling boot, which wall, in the position of rest, annularly sealingly rests against the axial securing sleeve in front of the start of the axial slots and which, at an increased speed, with the ventilation channels being released, lifts off the axial securing sleeve. In this case, too, it is possible to maintain in the same way a rotationally symmetric cross-section of the shaft journal and an undisturbed rotational cross-section of the rolling boot in that the slots between the axial fingers of the axial securing sleeve form the major component of the ventilation system. The sealing function is carried out by part of the convoluted boot wall which cooperates with the annular part of the axial securing sleeve in front of the start of the slots. Said wall can rest with a design-specified pretension on the axial securing sleeve and thus is able to lift off same at a predetermined speed under the influence of centrifugal forces. If in this embodiment, too, there is provided an annular lip at the end of the convoluted boot in the region adjoining the collar —which is not essential and whose elimination is even preferred to save axial length, there have to be provided knobs or ribs at the annular lip or on a corresponding counter face, which knobs or ribs keep the ventilation system permanently open as far as the sealing region. In this case, the seal can be of the labyrinth type seal.

The annular groove on the shaft journal is preferably a flat round groove which matches and engages an inner bead of the rolling boot. The rolling boot is preferably made of rubber to achieve more easily the required changes in shape under the influence of the centrifugal force.

The first solution and the second solution can be combined.

BRIEF DESCRIPTION OF THE DRAWINGS

Preferred embodiments of the inventive joint seal with ventilation means controlled as a function of speed are illustrated in the drawings wherein.

DETAILED DESCRIPTION OF THE DRAWINGS

Figure 1:
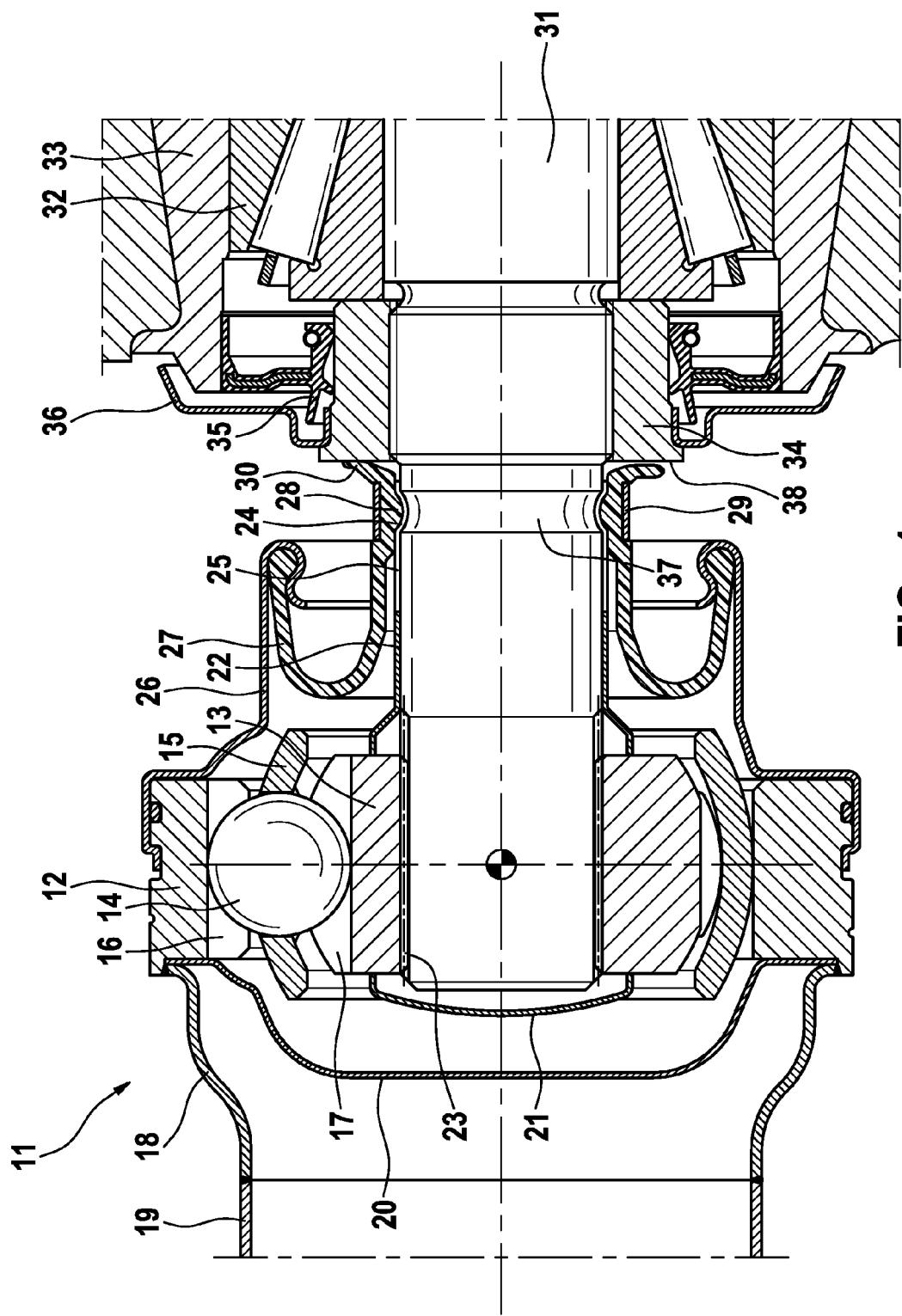
FIG. 1 shows a first embodiment of an inventive joint seal in a longitudinal section, with both a closed ventilation system (top) and a released ventilation system (bottom).

FIG. 1 shows a plunging joint 11 whose main components are an outer joint part 12, an inner joint part 13, torque transmitting balls 14 and a ball cage 15. The balls are held in tracks 16 in the outer joint part and in tracks 17 in the inner joint part. A transition piece 18 is welded to the outer joint part 12 and a tubular shaft 19 is welded to the transition piece 18. Towards the tubular shaft 19, the outer joint part 12 is sealed by a cover 20. A further cover 21 serves for separately sealing an inner aperture 23 of the inner joint part. Into the inner aperture 23 there is inserted a shaft journal 31 which is supported via a rolling contact bearing 32 in a drive housing 33, more particularly in the housing of a rear axle drive. The bearing 32 is clamped on by a nut 34 which has been threaded on to shaft journal 31. For sealing the shaft journal 31 relative to the drive housing 33 there are provided a shaft seal 35 and a protective cap 36. As usual, the shaft journal 31 and the inner aperture 23 of the inner joint part 13 comprise shaft teeth to permit mutual engagement in a rotationally fast way. The inner joint part 13 and thus the entire constant velocity universal joint are axially secured by a plate metal sleeve 22 which is firmly connected to the inner joint part 13 and which, towards the housing 33, ends in individual radially elastic fingers 24 between which there are formed longitudinal slots 25 which form ventilation channels. The fingers 24 are radially secured by a collar 28 of a rolling boot 27 which, via a further plate metal cap 26, is connected to the outer joint part. Via an inner bead, the collar 28 engages an annular groove 37 in the shaft journal 31. On the outside of the tensioning strip 29, the rolling boot 27 is followed by a sealing lip 30 which, in the position of rest shown in the upper half of the figure, rests in an annularly sealing way against the end face 38 of the nut 34. The interior of the constant velocity universal joint is thus sealed by the sealing lip 30 which, under material pretension, rests against the nut 34.

The lower half of the figure illustrates the situation at an increased speed wherein the sealing lip 30, under the influence of centrifugal forces, has changed from its conical shape into a radial shape, so that there are outwardly released ventilation channels which are formed by the slots 25 between the fingers 24 and which constitute a joint ventilation system. At higher speeds, the water, under the influence of the centrifugal forces, can escape from the joint interior, whereas at a lower speed, more particularly when the vehicle moves at a wading speed, the joint interior is outwardly sealed, with the penetration of water being prevented.

Figure 2:
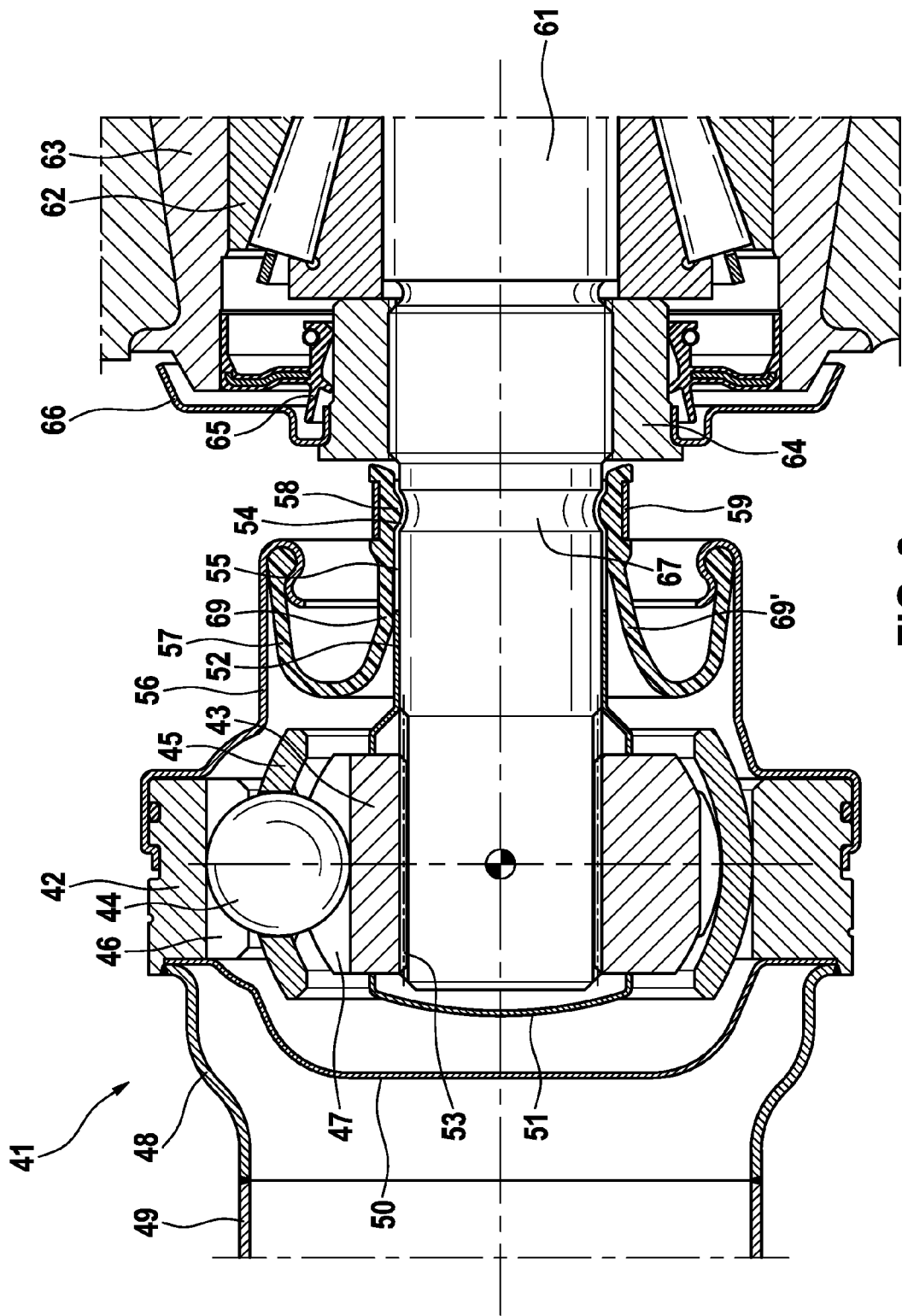
FIG. 2 shows a second embodiment of an inventive joint seal in a longitudinal section with both a closed ventilation system (top) and a released ventilation system (bottom).

In FIG. 2, the reference numbers of any details corresponding to those in FIG. 1 have been increased by 30. Reference is hereby made to the description of FIG. 1. The differences which have to be described only refer to the speed-dependent controllable ventilation of the joint seal illustrated. As in FIG. 1, the rolling boot 57 is secured by a plate metal sleeve 56 on the outer joint part 42 and again, by means of a collar 58, form-fittingly and positively engages an annular groove 67 of the shaft journal 61. In this case, too, the collar 58 is secured by a tensioning strip 59. However, deviating from FIG. 1, the rolling boot does not comprise a sealing lip at its free end; it rests against bent-open ends of the fingers 54 of the plate metal sleeve 52 which, in this case, too, for axially securing the constant velocity universal joint 41 on the shaft journal 61, is connected to the inner joint part 43. Again, the slots 55 between the fingers 54 form ventilation channels which, however, in the position of rest as shown in the upper half of the figure, are closed by an inner wall 69 which is positioned in the region of the unslotted sleeve 52. In the situation as illustrated in the lower half of the figure, at an increased speed, the inner wall 69' of the rolling boot 57 lifts off the axial securing sleeve 52, so that the region of the slots 55 between the fingers 54 is released towards the interior of the joint, with ventilation channels being formed by the slots 55 opening from the joint inside to the joint outside. Should this embodiment additionally comprise a sealing lip at the free end of the rolling boot, said sealing lip has to be provided with ribs or knobs, so that there is formed a permanently open ventilation system at the end of the rolling boot because the closing mechanism in this embodiment is formed by the rolling boot wall 69 further towards the inside. Said ribs or knobs can be provided in the form of labyrinth seals which make it more difficult for dirt to penetrate into the permanently open region of the ventilation system.

Figure 3:
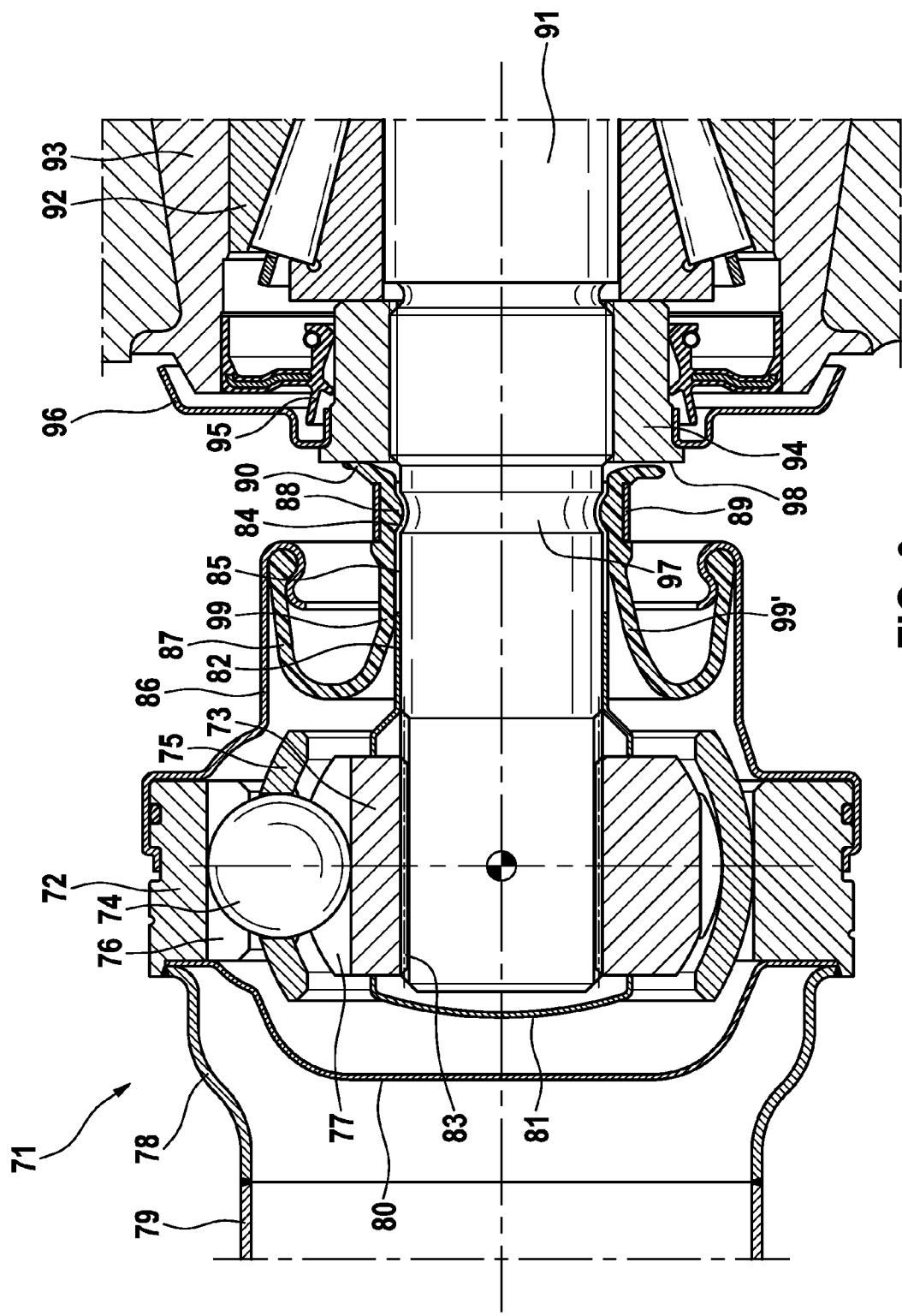
FIG. 3 shows a third embodiment of an inventive joint seal wherein the characteristics of FIG. 1 and FIG. 2 are combined, with both a closed ventilation system (top) and a released ventilation system (bottom).
Figure 4:
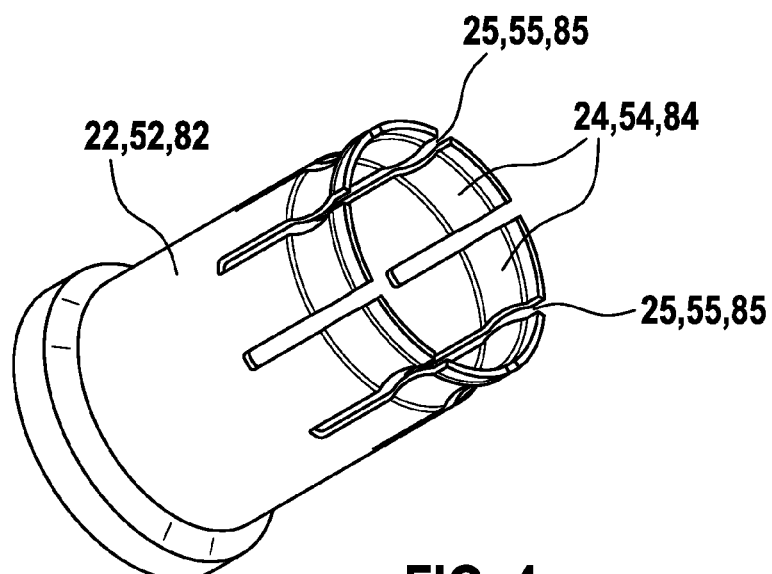
FIG. 4 is a perspective view of a metal sleeve, illustrating axial slots and axial fingers formed therein.

The reference numbers of any details in FIG. 3 which correspond to those in FIG. 1 have been increased by 60 and the reference numbers of any details corresponding to those shown in FIG. 2 have been increased by 30. To that extent, reference is made to the above descriptions which already refer to all the details. Thus, the upper half of FIG. 3 shows a combination of the sealing lip 90 sealingly engaging the end face 98 of the nut 94 while at rest, or at law rotational speeds, and the convoluted boot wall 99 sealingly engaging the axial securing sleeve 82 left of the slot 85. The lower half of FIG. 3 shows the vent mechanism open under the influence of centrifugal forces. That is, a pressure release passage is created by the convoluted boot wall 99' disengaging the securing sleeve 82 to expose the slot 85, and the sealing lip 90 disengaging the end face 98 of the nut 94. In this case, too, an annular groove can be formed in a radial face 98 of the shaft journal or the nut 94 to engage the sealing lip 90.

The invention claimed is:

1. A joint seal assembly for sealing a constant velocity universal joint relative to a shaft journal, wherein the shaft journal is firmly connected to an inner joint part of the constant velocity universal joint, the joint seal comprising: a rolling boot which is at least indirectly connected to an outer joint part of the constant velocity universal joint, and an axial securing sleeve axially fixing the constant velocity universal joint relative to the shaft journal, the axial securing sleeve being connected to the inner joint part and ending in individual axial fingers which radially elastically engage an annular groove in the shaft journal and are secured by a collar of the rolling boot and a slipped-on tensioning strip, wherein ventilation channels for the joint interior of the constant velocity universal joint are formed by axial slots extending through the outer periphery of the axial securing sleeve between the individual axial fingers which freely end in the interior of the rolling boot and can be closed towards the outside of the rolling boot by a sealing lip which is formed on to the rolling boot, which, in the position of rest, annularly sealingly contacts the shaft journal or a component connected thereto and which, at an increased speed, lifts off the shaft journal or the component connected thereto with the ventilation channels being released.

2. A seal assembly according to claim 1, wherein the component connected to the shaft journal is a nut which is connected to the shaft journal and serves to tension a shaft bearing.

3. A seal assembly according to claim 1, wherein the sealing lip has an approximately conical opening and, in the position of rest, contacts a radial face of the shaft journal or the component connected to the shaft journal.

4. A seal assembly according to claim 3, wherein the collar of the rolling boot engages an annular groove in the outer face of the shaft journal.

5. A joint seal assembly for sealing a constant velocity universal joint relative to a shaft journal, wherein the shaft journal is firmly connected to an inner joint part of the constant velocity universal joint, the joint seal comprising: a rolling boot which is at least indirectly connected to an outer joint part of the constant velocity universal joint, and an axial securing sleeve axially fixing the constant velocity universal joint relative to the shaft journal, the axial securing sleeve being connected to the inner joint part and ending in individual axial fingers which radially elastically engage an annular groove in the shaft journal and are secured by a collar of the rolling boot and a slipped-on tensioning strip, wherein ventilation channels for the joint interior are formed by axial slots between the individual axial fingers which end freely towards the outside of the rolling boot, and which, inside the rolling boot, can be closed by a wall of the rolling boot, which wall, in the position of rest, annularly sealingly contacts the axial securing sleeve in front of the start of the axial slots and which, at an increased speed, lifts off the axial securing sleeve to expose the ventilation channels formed by the axial slots.

6. A seal assembly according to claim 5, comprising an annular lip with ribs or cams formed on to the rolling boot to provide a permanently open ventilation system relative to the shaft journal or a component connected thereto.

7. A seal assembly according to claim 1, wherein the annular groove is a round groove, and at the rolling boot there is provided an inner bead which fits into and engages the annular groove.

8. A seal assembly according to claim 1, wherein the rolling boot is rubber.

9. A seal assembly according to claim 5, wherein the annular groove is a round groove, and at the rolling boot there is provided an inner bead which fits into and engages the annular groove.

10. A sealing assembly for a constant velocity universal joint and a shaft journal connected to an inner joint part of the constant velocity universal joint, comprising:
an axial securing sleeve connected at a first end to the inner joint part and axially fixing the constant velocity joint relative to the shaft journal, the sleeve comprising a plurality of axial fingers at a second end which radially elastically engage an annular groove in the shaft journal, the axial fingers forming a plurality of axial slots; and
a rolling boot connected at a first end to an outer joint part of the constant velocity universal joint and connected proximate a second end to the second end of the axial securing sleeve, the second end of the rolling boot comprising a sealing lip moveable, under the influence of centrifugal force, between a first sealing position annularly sealingly engaging the shaft journal or a component connected thereto, and a second venting position providing fluid passage by way of the axial slots from an interior of the constant velocity universal joint to an exterior environment.

11. A sealing assembly according to claim 10 wherein the rolling boot comprises a collar, and is secured in the region of the shaft annular groove near the second end of the axial sleeve by a tensioning strip engaging the collar.

12. A sealing assembly according to claim 10 wherein an interior wall of the rolling boot is moveable, under the influence of centrifugal force, between a first position covering the axial slots to seal the interior of the constant velocity universal joint, and a second position disengaged from the axial slots to provide fluid passage from the interior of the constant velocity joint to the exterior environment.

13. A sealing assembly according to claim 10, wherein the component connected to the shaft journal is a nut tensioning a shaft bearing.

14. A sealing assembly according to claim 10, wherein, in the first sealing position, the sealing lip contacts an annular face of the shaft journal or component and, in the second venting position, the sealing lip opens outwardly.

15. A sealing assembly according to claim 10 wherein the rolling boot is rubber.

16. A sealing assembly for a constant velocity universal joint and a shaft journal connected to an inner joint part of the constant velocity universal joint, comprising:
an axial securing sleeve connected at a first end to the inner joint part and axially fixing the constant velocity joint relative to the shaft journal, the sleeve comprising a plurality of axial fingers at a second end which radially elastically engage an annular groove in the shaft journal, the axial fingers forming a plurality of axial slots; and
a rolling boot connected at a first end to an outer joint part of the constant velocity universal joint and connected proximate a second end to the second end of the axial securing sleeve,
wherein the axial slots extend from an interior of the constant velocity joint to beyond the second end of the rolling boot to an exterior environment of the constant velocity joint, and
wherein an interior wall of the rolling boot is moveable, under the influence of centrifugal force, from a first position sealingly engaging the axial sleeve to close the axial slots, and a second position off of the axial sleeve to expose the axial slots to the joint interior and thereby vent the joint interior.

17. A sealing assembly according to claim 16, wherein the annular groove is a round groove and wherein the rolling boot comprises an inner bead which fits into and engages the annular groove.

18. A sealing assembly according to claim 16, wherein the second end of the rolling boot comprises a sealing lip moveable, under the influence of centrifugal force, between a first sealing position annularly sealingly engaging the shaft journal or a component connected thereto, and a second venting position providing fluid passage by way of the axial slots from the interior of the constant velocity universal joint to the exterior environment.

19. A sealing assembly according to claim 16 wherein the rolling boot is rubber.

* * * * *